V. PUHA.
ALARM.
APPLICATION FILED JUNE 15, 1909.

966,950. Patented Aug. 9, 1910.

Witnesses
Samuel Payne
H. H. Butler

Inventor
Victor Puha.
By H. C. Evert
Attorney

UNITED STATES PATENT OFFICE.

VICTOR PUHA, OF NEWARK, NEW JERSEY.

ALARM.

966,950.

Specification of Letters Patent.

Patented Aug. 9, 1910.

Application filed June 15, 1909. Serial No. 502,295.

*To all whom it may concern:*

Be it known that I, VICTOR PUHA, a subject of the King of Hungary, residing at Newark, in the county of Essex and State of New Jersey, have invented certain new and useful Improvements in Alarms, of which the following is a specification, reference being had therein to the accompanying drawing.

This invention relates to alarms, and the invention has for its primary object to provide an alarm for animals and birds that will scare away animals and birds and prevent them from injuring or consuming vegetables in a garden in which the alarm is located.

Another object of this invention is to provide a device that will automatically create a noise and scare away chicken-hawks, coyotes, or similar animals and birds that prey upon small fowls, in barnyards.

A still further object of this invention is to provide a device of the above character that will be operated by the wind and serve functionally as a "scare-crow," either in a garden or field.

With the above and other objects in view which will more readily appear as the invention is better understood, the same consists in the novel construction, combination and arrangement of parts to be presently described and then claimed.

Figure 1:
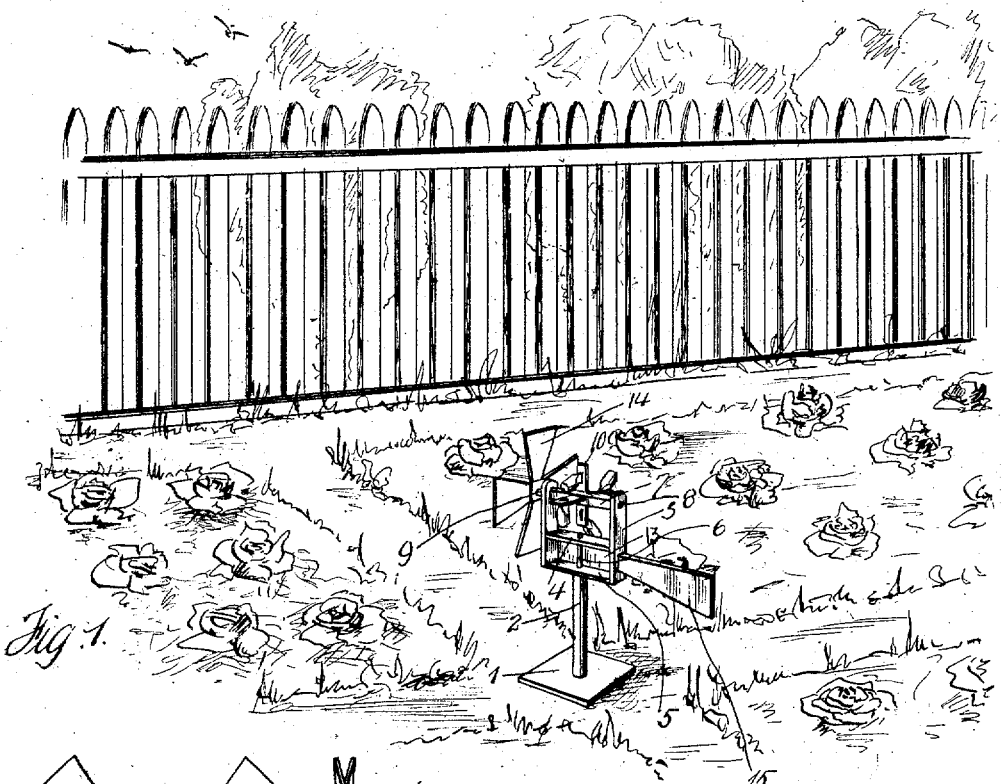
Figure 2:
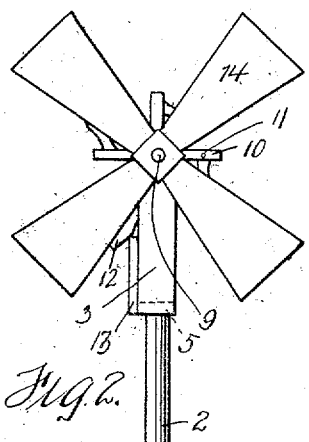
Figure 3:
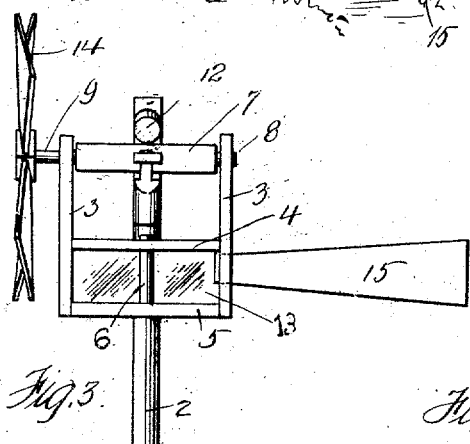
Figure 4:
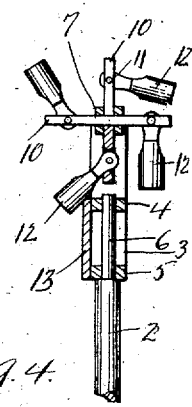

In the drawings, Figure 1 is a perspective view of the alarm as positioned in the garden, Fig. 2 is a front elevation of the alarm, Fig. 3 is a side elevation of the same, and Fig. 4 is a vertical sectional view of a portion of the alarm.

To put my invention into practice, I provide a base plate 1 with a pedestal or post 2 and upon the upper end of the pedestal or post there is revolubly mounted a U-shaped frame, comprising side arms 3 and connecting frames 4 and 5. A vertical pin 6 extends through the frames 4 and 5 into the upper end of the pedestal 2 for revolubly holding the U-shaped frame.

Revolubly mounted in the upper ends of the side arms 3 is a hub 7 having pintles 8 and 9 extending through the side arms 3. The hub 7 is provided with radially disposed spokes 10 and pivotally mounted in the outer ends of said posts, as at 11, are clappers 12 adapted to impinge a plate 13 carried by one side of the U-shaped frame.

The pintle 9 of the hub 7 is provided with a bladed wind wheel or fan 14, while one of the side arms 3 is provided with a vane 15 for normally holding the wind wheel 14 to the wind, whereby the hub 7 will be revolved and cause the clappers 12 to intermittently strike the plate 13 and make a noise that will be sufficient to scare such birds or animals that might otherwise frequent a yard, garden or field.

The alarming device is made of light and durable weight and the base plate 1 of a sufficient size to firmly support the device and prevent the same from being blown over, although the device can be anchored by placing stone or other heavy substances upon the base plate 1.

Having now described my invention, what I claim as new, is:—

An alarm for the purpose set forth comprising a base plate, a standard carried by said plate and having a vertically-disposed pin at the top thereof, said pin of less diameter than the top of the standard whereby a shoulder is provided, a U-shaped member mounted upon said shoulder and having the pin extending through the bottom thereof, a transversely-extending flat member secured within the U-shaped member and having the pin extending therethrough, a vertically-disposed plate secured to the bottom and the sides of the U-shaped member and to said transverse member, said plate of less length within said U-shaped member, a vane having its inner end secured in one of the arms of the U-shaped member and at a point between the bottom of said U-shaped member and said transverse member, a rotatable member interposed between the upper ends of the arms of the U-shaped member and provided with pintles journaled in said arms, one of said pintles being of greater length than the other and projecting from its respective arm, a wind wheel secured to the outer end of said elongated pintle and disposed upon the opposite side of the U-shaped member with respect to that side to which the vane is secured, a series of radially-disposed members secured to said rotatable member approximately centrally thereof, each of said radially-disposed members having its outer end provided with a longitudinally-extending slot, clappers having reduced ends extending in said slots, and means extending transversely of the radially disposed members for connecting the clappers thereto, said clappers when said rotatable member revolves adapted to engage the top of the vertically-disposed plate.

In testimony whereof I affix my signature in the presence of two witnesses.

VICTOR PUHA.

Witnesses:
 JAMES SCHREINER,
 Z. VOIRA DES HINES.